United States Patent
Kovacs

(10) Patent No.: US 6,363,171 B1
(45) Date of Patent: Mar. 26, 2002

(54) APPARATUS FOR RECOGNIZING ALPHANUMERIC CHARACTERS

(75) Inventor: Zsolt M. Kovacs, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 08/373,937

(22) Filed: Jan. 13, 1995

(30) Foreign Application Priority Data

Jan. 13, 1994 (EP) .............................................. 94830011

(51) Int. Cl.⁷ ................................................. G06K 9/62
(52) U.S. Cl. .......................... 382/161; 382/156; 706/20
(58) Field of Search ................................ 382/156, 158, 382/161, 224; 395/21, 24; 706/15, 20, 26

(56) References Cited

U.S. PATENT DOCUMENTS

| | | | | |
|---|---|---|---|---|
| 5,052,043 A | * | 9/1991 | Gaborski ..................... | 382/155 |
| 5,058,182 A | * | 10/1991 | Kuan et al. .................. | 382/203 |
| 5,060,278 A | * | 10/1991 | Fukumizu ..................... | 382/14 |
| 5,095,443 A | * | 3/1992 | Watanabe ..................... | 395/24 |
| 5,105,468 A | * | 4/1992 | Guyon et al. ................ | 382/155 |
| 5,155,801 A | * | 10/1992 | Lincoln ........................ | 395/21 |
| 5,255,347 A | * | 10/1993 | Matsuba et al. ............. | 395/23 |
| 5,442,715 A | * | 8/1995 | Gaborski et al. ........... | 382/187 |
| 5,475,768 A | * | 12/1995 | Diep et al. ................... | 382/155 |
| 5,588,091 A | * | 12/1996 | Alkon et al. .................. | 395/24 |

OTHER PUBLICATIONS

Fincher et al., "Multi–Sensor Data Fusion Using Neural Networks," *IEEE Int. Conf. on Systems, Man, and Cybernetics*, pp. 835–838, 1990.

Chua et al., "Cellular Neural Networks: Applications," *IEEE Trans. on Circuits and Systems* 35(10):1273–90, 1988.

* cited by examiner

*Primary Examiner*—Matthew C. Bella
(74) *Attorney, Agent, or Firm*—Lisa K. Jorgenson; David V. Carlson; Seed IP Law Group PLLC

(57) ABSTRACT

An alphanumeric character image recognition system includes a first stage comprising at least a first, second and third digital image signal processing network having each at least one input terminal and at least one output terminal and said networks being designed to process image information from digital image signals, and comprising at least a first, second and third memory register having each at least one input terminal and at least one output terminal and the input terminals of the first, second and third memory registers being connected to the output terminal of the first network, the output of the second network and the output terminal of the third network respectively and said memory registers being designed to contain the image information processed by the first, second and third digital image signal processing networks, and a second stage characterized in that said second stage comprises at least one first and one second classifier network having each at least one first and one second input terminal and a plurality of output terminals, the first input terminal of the first classifier network being connected to the output terminal of the first memory register and the second input terminal of said first classifier network being connected to the output terminal of the second memory register and the first input terminal of the second classifier network being connected to the output terminal of the second memory register and the second input terminal of said second classifier network being connected to the output terminal of the third memory register and at least one third classifier network having a plurality of input terminals connected to a plurality of output terminals of the first and second classifier networks and a plurality of output terminals which are output terminals of the system and said classifier networks being designed to carry out consecutive statistical operations on the image information until there are obtained statistical values corresponding to a predetermined classification of images to be recognized.

31 Claims, 7 Drawing Sheets

APPARATUS FOR RECOGNIZING ALPHANUMERIC CHARACTERS

TECHNICAL FIELD

The present invention relates to image recognition systems and in particular to alphanumeric character image recognition systems.

BACKGROUND OF THE INVENTION

Alphanumeric character image recognition systems can have numerous applications.

For example, in mail applications where it is necessary to read addresses written on letter envelopes, postcards or packages to be then sent to an assigned destination, the use of such systems is useful in automating the reading and sending operations, reducing the costs of labor presently employed to carry out the above operations, and also reducing service delays. These systems can also be used in the recognition of tax or census forms or in the recognition of medical prescription texts.

Another application of such systems, which have recently taken on ever growing importance, is tied to the computer miniaturization process. Indeed, in the provision of this process there has emerged a limit represented by the dimensions of the typical keyboard, which cannot be reduced below a certain size. To replace the keyboard, it was thought to use a small tablet connected to the computer. On the tablet the user can write alphanumeric characters in sequence with a pen. Thus, a recognition system is necessary to provide an interface with the computer.

It is known that, in general, an alphanumeric character image recognition system consists of three cascaded stages.

The first of these stages normalizes digital image signals to eliminate irregularities present in human writing. Aspects such as image size, character slant and defining line thickness are normally considered in this stage.

The second stage processes from the normalized digital image signals of the first stage image information that will be used by the third stage to perform classification of the images to be recognized.

In the literature, there are different descriptions of alphanumeric character recognition systems. For example, to mention the better-known systems, AT&T uses systems based on the so-called "k nearest neighbour" algorithm described in Pattern Classification and Scene Analysis by R. O. Duda and P. E. Hart, N.Y.: John Wiley and Sons, 1973, or systems based on multilevel perceptrons. The latter are described in the article "Learning internal representations by error propagation" by D. E. Rumelhart, G. E. Hinton, R. J. Williams, published in Parallel Distributed Processing, D. E. Rumelhart, J. L. McCleland and the PDP Research Group, publ. MIT Press, Cambridge, Mass. pages 318–362, 1986.

Systems based on the "k nearest neighbour" algorithm and those based on multilevel perceptrons are applied to digital image signals that are normalized in size and blurred with a Gaussian filter as described in the article "Handwritten Digit Recognition with a Back-Propagation Network" by Y. Le Cun, B. Boser, J. S. Denker, D. Henderson, R. E. Howard, W. Hubbard, L. D. Jackel, published in Neural Information Processing Systems, D. Touretzky publ., Vol. 2, Morgan Kaufmann, 1990. AEG uses a system comprising a first stage which performs normalization of image size, character slant, and line thickness defining the characters, and a second stage based on the "Karhunen Loeve Transform" described in the article "Karhunen Loeve feature extraction for neural hand-written character recognition" by P. J. Grother published in Proc. of Applications of Artificial Neural Network III, Orlando, SPIE, April 1992. A third stage included in the system is provided with a polynomial classifier that is known in the art.

IBM uses a system including a first and a second image information processing stage and a third stage provided by a multilevel perceptron.

SUMMARY OF THE INVENTION

In accordance with one aspect of the present invention an apparatus is provided for recognizing alphanumeric characters from first, second, and third signals carrying processed information from images of the characters. A first neural or classifier network includes a first input terminal that receives the first signal, a second input terminal that receives the second signal, and a plurality of output terminals. A second neural or classifier network includes a first input terminal that receives the second signal, a second input terminal that receives the third signal, and a plurality of output terminals. A third neural or classifier network includes a plurality of input terminals each coupled to one of the output terminals of either the first or second classifier networks, and a plurality of output terminals that carry statistical values corresponding to a predetermined classification of the images. The first, second, and third classifier networks carry out consecutive statistical operations on the processed information until the statistical values are generated.

In another aspect of the invention, a fourth neural or classifier network includes a first input terminal that receives the first signal, a second input terminal that receives the third signal, and a plurality of output terminals that are coupled to the input terminals of the third classifier network.

In still another aspect of the invention, the first, second, third, or fourth classifier networks may include a neural network that includes one or more levels of neurons. These neurons may have a sigmoidal activation function, i.e., may be sigmoidal neurons.

In yet another aspect of the invention, the first, second, and third signals may carry information including the position of the dark points of the images, the directions of the tangents to the edges of the images at the points that compose the edges, and the contours formed by the points that compose the edges.

An advantage of one aspect of the present invention is an alphanumeric character image recognition system having improved recognition quality as compared to the systems known heretofore in the scientific and industrial environment.

BRIEF DESCRIPTION OF THE DRAWINGS

The characteristics and advantages of the alphanumeric character image recognition system in accordance with the present invention are set forth in the following description of an embodiment thereof given by way of nonlimiting example with reference to the annexed drawings.

DETAILED DESCRIPTION OF THE INVENTION

Figure 1:
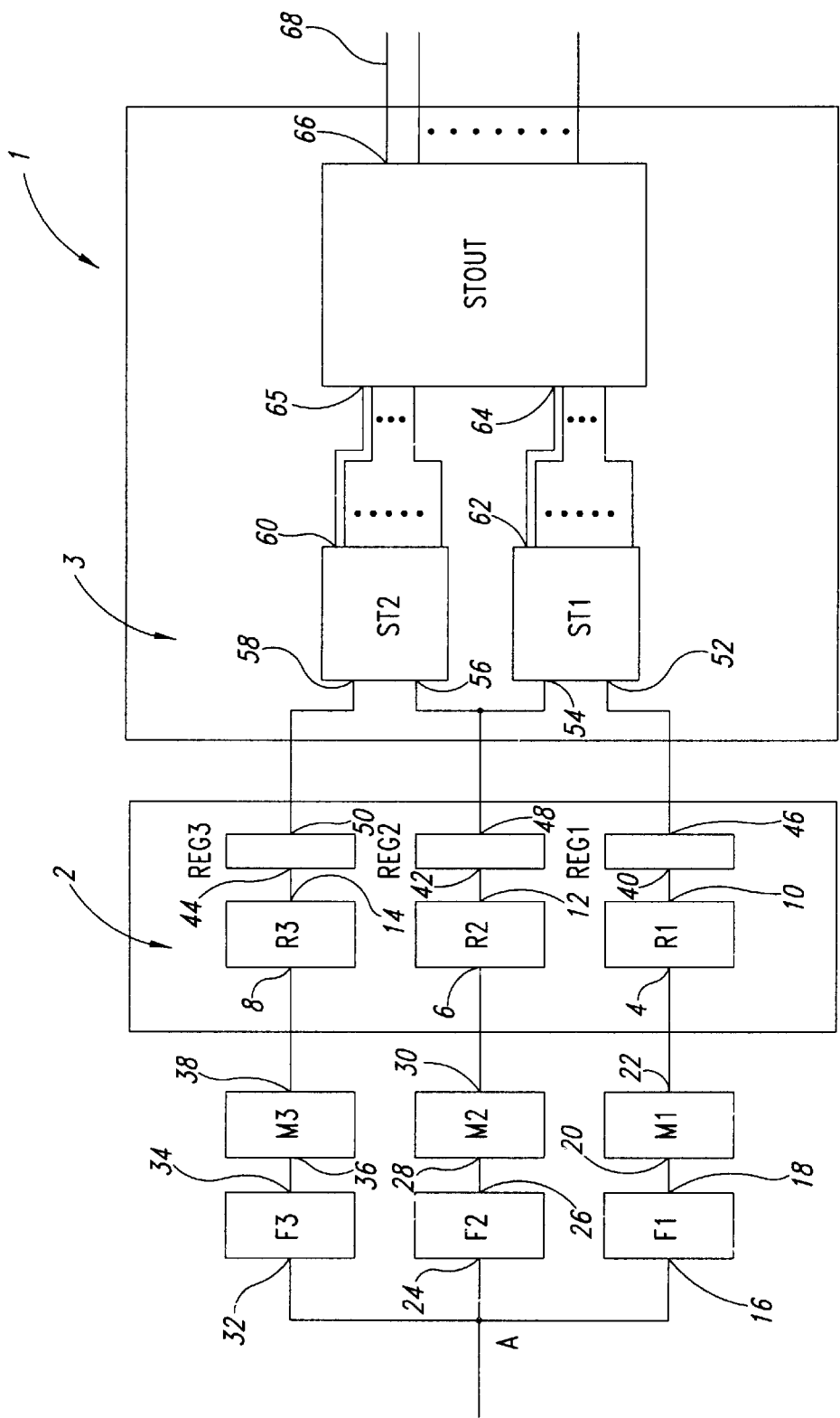
FIG. 1 shows a block diagram of an embodiment of an alphanumeric character image recognition system in accordance with the present invention.

The block diagram of FIG. 1 shows a preferred embodiment of an alphanumeric character image recognition system 1 that comprises a first stage 2 and a second stage 3.

In the first stage 2 are included first, second, and third digital signal processing networks R1, R2, and R3 for an input image obtained through a scanner or through a telecamera, not shown, because a conventional system is used and such input systems are well-known in the art.

The networks R1, R2, and R3 each have at least one input terminal 4, 6, and 8 respectively coupled to an input circuit node A, which is an input terminal of the system 1, and one output terminal 10, 12, and 14 respectively.

Between the input terminal 4 of the first network R1 and the input circuit node A are inserted a first filter F1, having at least one input terminal 16 and at least one output terminal 18, and a first memory element M1 having at least one input terminal 20 connected to the output terminal 18 of the filter F1, and at least one output terminal 22.

Between the input terminal 6 of the second network R2 and the input circuit node A are inserted a second filter F2 having at least one input terminal 24 and at least one output terminal 26, and a second memory element M2 having at least one input terminal 28 connected to the output terminal 26 of the filter F2 and at least one output terminal 30.

Between the input terminal 8 of the third network R3 and the input circuit node A are inserted a third filter F3 having at least one input terminal 32 and at least one output terminal 34, and a third memory element M3 having at least one input terminal 36 connected to the output terminal 34 of the filter F3 and at least one output terminal 38.

The filters F1, F2, F3 and consequently the memory elements M1, M2 and M3 are present in one preferred embodiment, but they may be omitted in other embodiments. Furthermore, these elements can be replaced by optional normalization or processing elements.

For example, there is described below the operation of an alphanumeric character recognition system not including the filter F3 and the memory element M3, i.e., where the input terminal 8 of the third network R3 is connected directly to the circuit node of input A.

In the first stage 2 are also included a first memory register REG1, a second memory register REG2 and a third memory register REG3 each having at least one respective input terminal 40, 42, and 44, and at least one respective output terminal 46, 48, and 50.

The input terminals 40, 42, and 44 of said first REG1, second REG2 and third REG3 memory registers are connected to the output terminal 10 of the first network R1, to the output terminal 12 of the second network R2, and to the output terminal 14 of the third network R3 respectively.

The second stage 3 of the system 1 includes a first classifier network ST1 and a second classifier network ST2 each having at least a first and a second input terminal 52, 54 and 56, 58 respectively, and a plurality of output terminals 60 and 62, respectively.

The first input terminal 52 of the first statistical network ST1 is connected to the output terminal 46 of the first memory register REG1 while the second input terminal 54 of said first classifier network ST1 is connected to the output terminal 48 of the second memory register REG2.

The first input terminal 56 of the second classifier network ST2 is connected to the output terminal 48 of the second memory register REG2 while the second input terminal 58 of said second classifier network ST2 is connected to the output terminal 50 of the third memory register REG3.

In stage 3 is also included a third classifier network STOUT having a plurality of input terminals 64 and 65 connected to a plurality of output terminals 60 and 62 of the first ST1 and second ST2 classifier networks and a plurality of output terminals 66 which are coupled to the output terminals 68 of the system 1.

Figure 2:
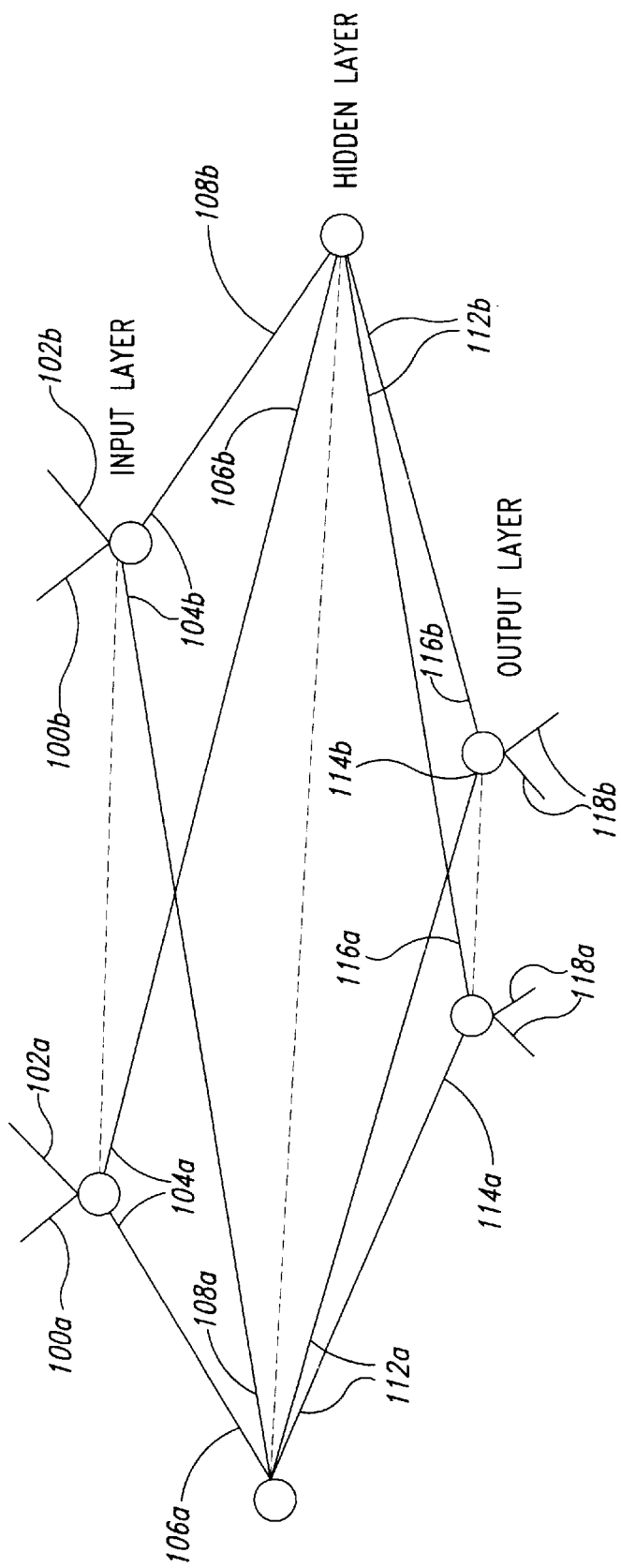
FIG. 2 shows one embodiment of a classifier network for use in the recognition systems of FIGS. 1 and 2.

More specifically, first classifier network ST1, second classifier network ST2, and third classifier network STOUT are neural networks. As shown in FIG. 2, the first ST1 and second ST2 classifier networks include each at least an input or a first layer of neurons, each of the neurons of the first classifier network ST1 having at least a first and a second input terminal 100 and 102 connected to the output terminal 46 of the first memory register REG1 and to the output terminal 48 of the second memory register REG2 respectively, and each of the neurons of the second classifier network ST2 having at least a first and a second input terminal 100 and 102 connected to the output terminal 48 of the second memory register REG2 and to the output terminal 50 of the third memory register REG3 respectively. Each neuron in both ST1 and ST2 also includes an output terminal 104.

The first ST1 and second ST2 classifier networks can also each include at least a hidden or a second layer of neurons, each having a plurality of input terminals 106 and 108 connected to a plurality of output terminals 104 of the first layer of neurons.

The first ST1 and second ST2 classifier networks can also each include at least an output or third layer of neurons, each having a plurality of input terminals 114 and 116 connected to a plurality of output terminals 112 of the second layer of neurons. Each neuron of the third layer also includes an output terminal 118.

Depending upon the number of neuron layers in ST1 and ST2, either output terminals 104, 112, or 118 are coupled to output terminals 60 and 62 (FIG. 1) respectively. For example, if only a first layer is present, output terminals 104 are coupled to terminals 60 and 62, respectively. If only a first and second layer are present, then output terminals 112 are coupled to terminals 60 and 62, respectively. If first, second, and third neuron layers are present, output terminals 118 are coupled to output terminals 60 and 62, respectively. The present invention contemplates ST1 and ST2 having the same or a different number of neuron layers.

Figure 3:
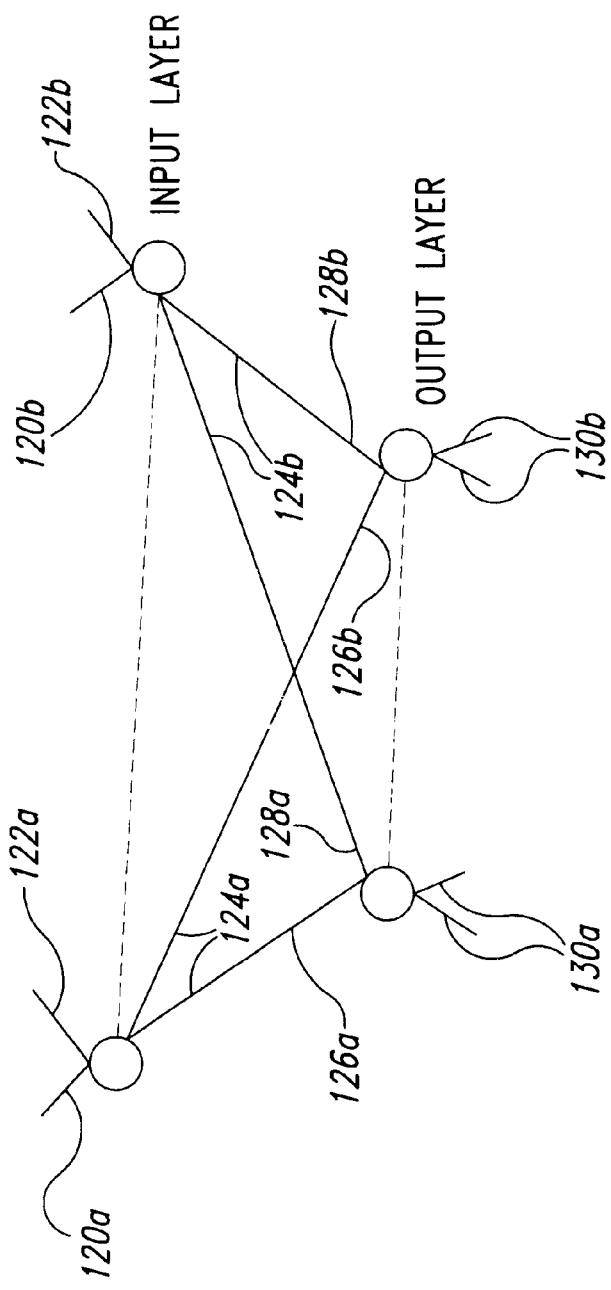
FIG. 3 shows another embodiment of a classifier network for use in the recognition systems of FIGS. 1 and 2.

Referring to FIG. 3, the classifier network STOUT includes at least an input or first layer of neurons having each a plurality of input terminals 120 and 122 connected via output terminals 60 and 62 and input terminals 65 and 64 (FIG. 1), respectively, to a plurality of output terminals of neurons of the first classifier network ST1 and neurons of the second classifier network ST2. Each neuron also includes an output terminal 124.

The classifier network STOUT can also include at least an output or second layer of neurons, each having a plurality of input terminals 126 and 128 connected to a plurality of output terminals 124 of the first layer of neurons. Each neuron of the second layer also includes an output terminal 130.

As discussed above for ST1 and ST2, either output terminals 124 or 130 are coupled to output terminals 66 (FIG. 1) depending upon whether STOUT includes one or two neuron layers, respectively.

Referring to FIGS. 2 and 3, although each neuron is shown having two inputs, a lesser or greater number of inputs is contemplated by the present invention. For example, each neuron of the second and third layers of ST1 and ST2, and each neuron of the second layer of STOUT, may have one input terminal associated with each neuron present in the preceding layer. Furthermore, the present invention contemplates ST1 and ST2 having the structure shown in FIG. 3, and STOUT having the structure shown in FIG. 2.

Figure 4:
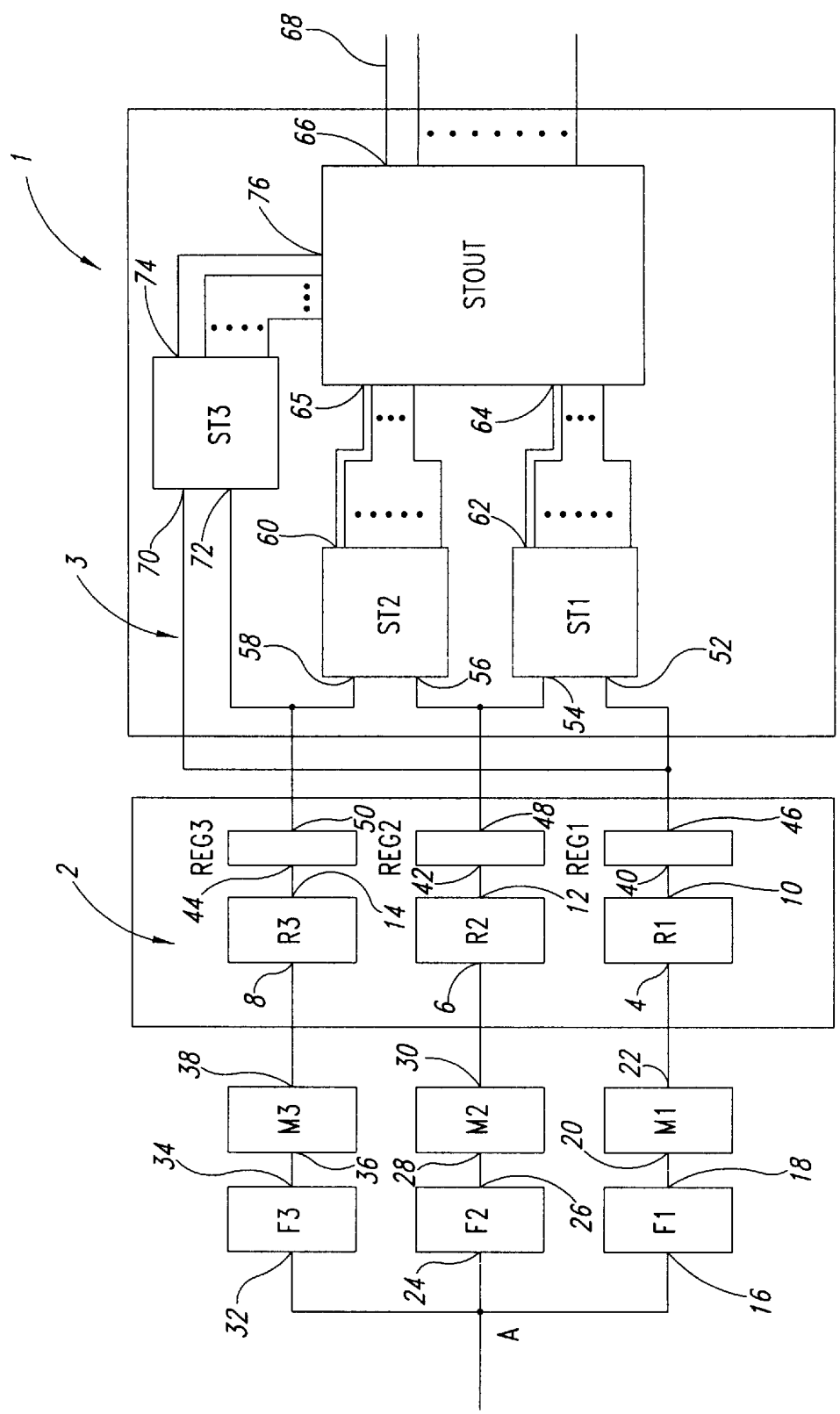
FIG. 4 shows a block diagram of another embodiment of an alphanumeric character image recognition system in accordance with the present invention.

Referring to FIG. 4, to further improve the recognition quality of the system 1, in the stage 3 can also be included a fourth classifier network ST3 having at least a first and a second input terminal 70 and 72 and the first input terminal 70 of said fourth classifier network ST3 being connected to the output terminal 46 of the first memory register REG1 and the second input terminal 72 being connected to the output terminal 50 of the third memory register REG3.

The classifier network ST3 also has a plurality of output terminals 74 connected to a plurality of input terminals 76 of the third classifier network STOUT.

Referring to FIG. 2 and as described above for ST1 and ST2, said classifier network ST3 is also a neural network comprising at least a first layer of neurons having each at least a first and a second input terminal connected to the output terminal 46 of the first memory register REG1 and the output terminal 50 of the third memory register REG3. Each neuron also has an output terminal.

The classifier network ST3 can also include at least a second layer of neurons having each a plurality of input terminals connected to a plurality of output terminals of the first layer of neurons. The output terminals of the second layer neurons (or the first layer neurons if the second layer neurons are omitted) within ST3 are coupled via output terminals 74 to the input terminals 76 of STOUT.

TABLE I shows the dimensions of classifier networks ST1, ST2, ST3, and STOUT according to one embodiment of the invention.

TABLE I

DIMENSIONS OF THE NEURAL NETWORKS

| NEURAL NETWORK ST1 | digit | alfa |
|---|---|---|
| input layer | 128 nodes | 128 nodes |
| hidden layer | 128 nodes | 272 nodes |
| output layer | 10 nodes | 26 nodes |
| NEURAL NETWORK ST2 | digit | alfa |
| input layer | 160 nodes | 160 nodes |
| hidden layer | 128 nodes | 192 nodes |
| output layer | 10 nodes | 26 nodes |
| NEURAL NETWORK ST3 | digit | alfa |
| input layer | 160 nodes | 160 nodes |
| hidden layer | 128 nodes | 192 nodes |

TABLE I-continued

DIMENSIONS OF THE NEURAL NETWORKS

| output layer | 10 nodes | 26 nodes |
|---|---|---|
| NEURAL NET.STOUT with ST1 and ST2 | digit | alfa |
| input layer | 20 nodes | 52 nodes |
| output layer | 10 nodes | 26 nodes |
| NEURAL NET.STOUT with ST1, ST2 and ST3 | digit | alfa |
| input layer | 30 nodes | 78 nodes |
| output layer | 10 nodes | 26 nodes |

Now operation of the system 1 in accordance with the present invention will be examined.

Digital signals of an image input to the system 1 are normalized in size and slant by filter F1 to then be stored in the memory element M1 and, by the filter F2, which operates in parallel with the filter F1, the signals are normalized in slant and then stored in the memory element M2.

As mentioned above, one or all of the filters and corresponding memory elements are not included in one embodiment of the recognition system described here.

The normalized digital signals stored in the memory element M1 and in the memory element M2 are inputs of the networks R1 and R2 respectively.

Said networks R1 and R2 are designed to process from the normalized digital signals image information that will be used subsequently to recognize the image input to the system 1.

More specifically, using the "distance transform" described in the article "Computer Recognition of Hand-Written Characters using the Distance transform" of Zs. M. Kovacs and R. Guerrieri, which appeared in Electronics Letters, Vol. 28, No. 19, pages 1825–1827, 1992, the network R1 processes information on the position of the dark points of the image to be recognized.

The dark-point information is then stored in the memory register REG1.

The network R2 processes image information on the direction of the edge of the image to be recognized. More specifically, the normalized image is divided into regions of the same size and the image points belonging to vertical, horizontal and diagonal lines at 45 and 135 degrees with respect to the image edge are counted for each region.

These operations are described in the article "Statistical and Neural Classification of Hand-Written Numerals: A Comparative Study" by J. Cao, M. Shridhar, F. Kimura and M. Ahmadi published in Proc. 11th IAPR, The Hague, The Netherlands, Vol. 2, pages 643–646, in August 1992.

The image information thus processed by network R2 is stored in the memory register REG2.

The network R3, on the other hand, acts on unnormalized digital signals of the image input, because as stated above, F3 and M3 are not included in this embodiment, but F1, M1, F2, and M2 are included.

Network R3 processes from the image signals information concerning the curvature of the image edge to be recognized.

More specifically, the image is divided into regions and the image points that belong to the edge are separated into two groups, those belonging to the concave zones of the edge and those belonging to the convex zones.

The image points belonging to each group are then further divided depending on the slant of the normal to the edge passing through each of them.

Of these image points, only those whose tangent to the edge has an angular variation above a pre-set threshold are then considered.

These operations are described in the article "A neural Net OCR using Geometrical and Zonal Pattern Features" by H. Takahashi published in Proc. of Int. Conf. on Document Analysis and Recognition, France, pages 821–828, 1991.

The image information thus obtained is stored in the memory register REG3.

The image information stored in the memory registers REG1, REG2, REG3 is input to the classifier networks ST1 and ST2.

The classifier networks ST1 and ST2 are neural networks operating in parallel, which perform on the image information consecutive statistical operations until they obtain statistical values that are input to the classifier network STOUT.

The network STOUT is also a neural network that coordinates the statistical values coming from the networks ST1 and ST2 and supplies at outputs 66 statistical values corresponding to a predetermined classification of the image to be recognized.

In particular, the classifier networks ST1, ST2, ST3 and STOUT are made up of multilevel perceptrons of the "feed forward" type with neurons having the so-called "activation functions" of the sigmoidal type. These types of neural networks are well-known in the art and have been previously used in different circuit combinations in prior art character recognition systems. The structural details and operation of certain elements such as individual elements F1–F3, M1–M3, R1–R3, Reg1–Reg3, ST1–ST3 and STOUT, are known in the art, per se but are combined, in new ways, both in parallel and in series respectively, as described, to provide the invention. The combination of known elements in this particular circuit configuration provides a new, improved result not possible in the prior art.

Figure 5:
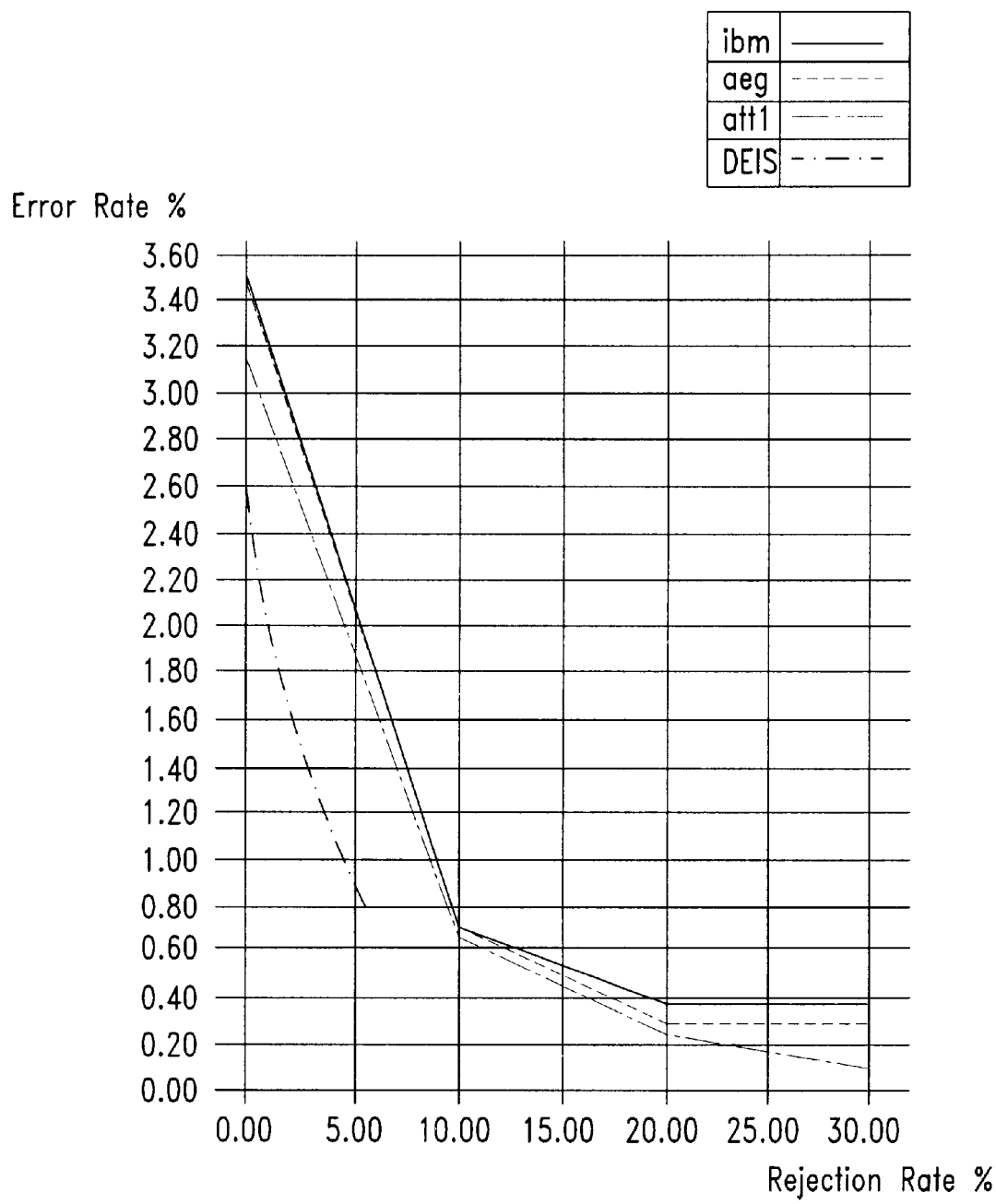
FIG. 5 shows a chart in which the numeric character image recognition quality of a recognition system provided in accordance with the present invention is compared with that of known systems for the same numeric character images.
Figure 6:
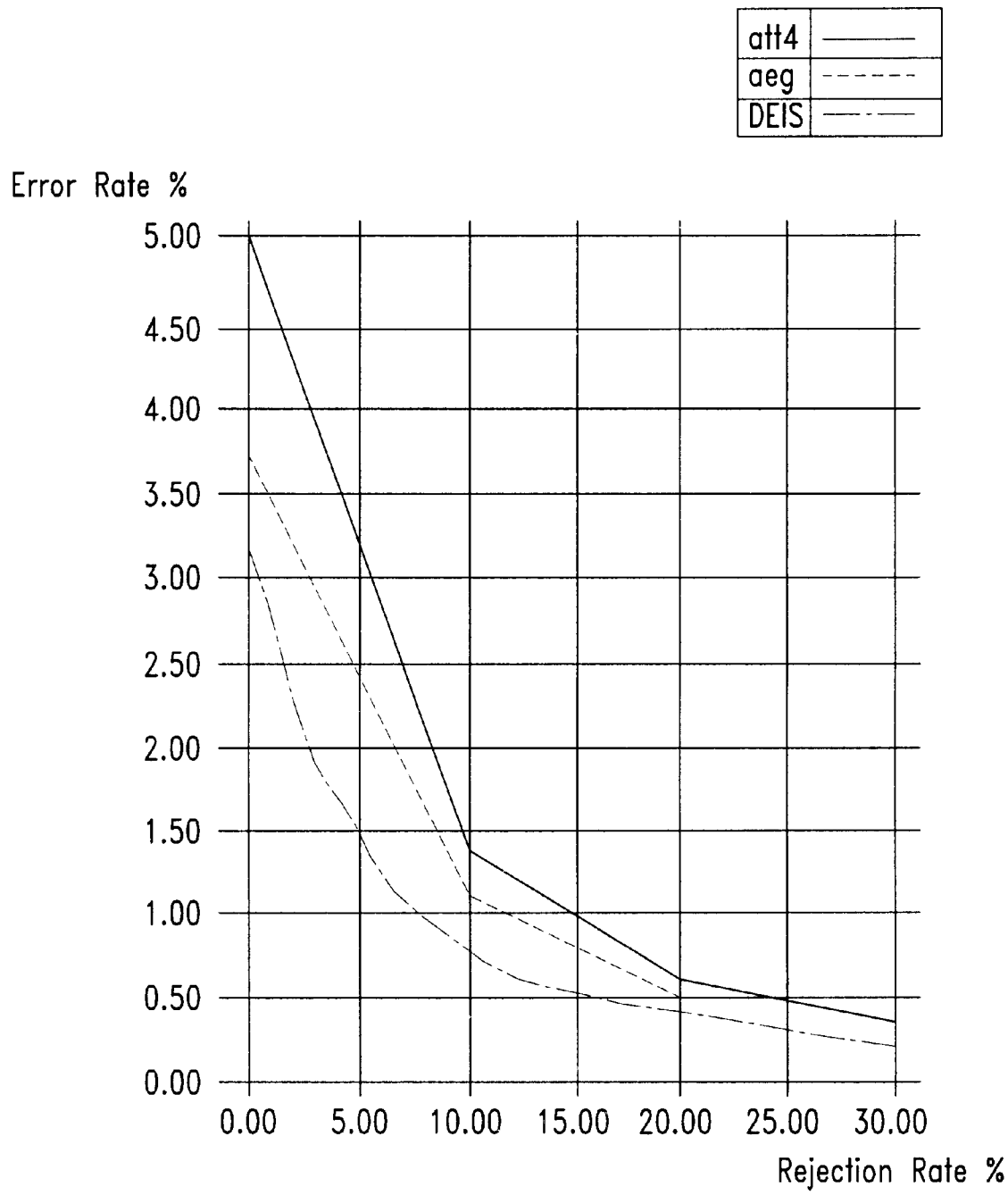
FIG. 6 shows a chart in which the image recognition quality of capital, i.e., upper case, letters for a recognition system provided in accordance with the present invention is compared with that of known systems for the same upper case letters.
Figure 7:
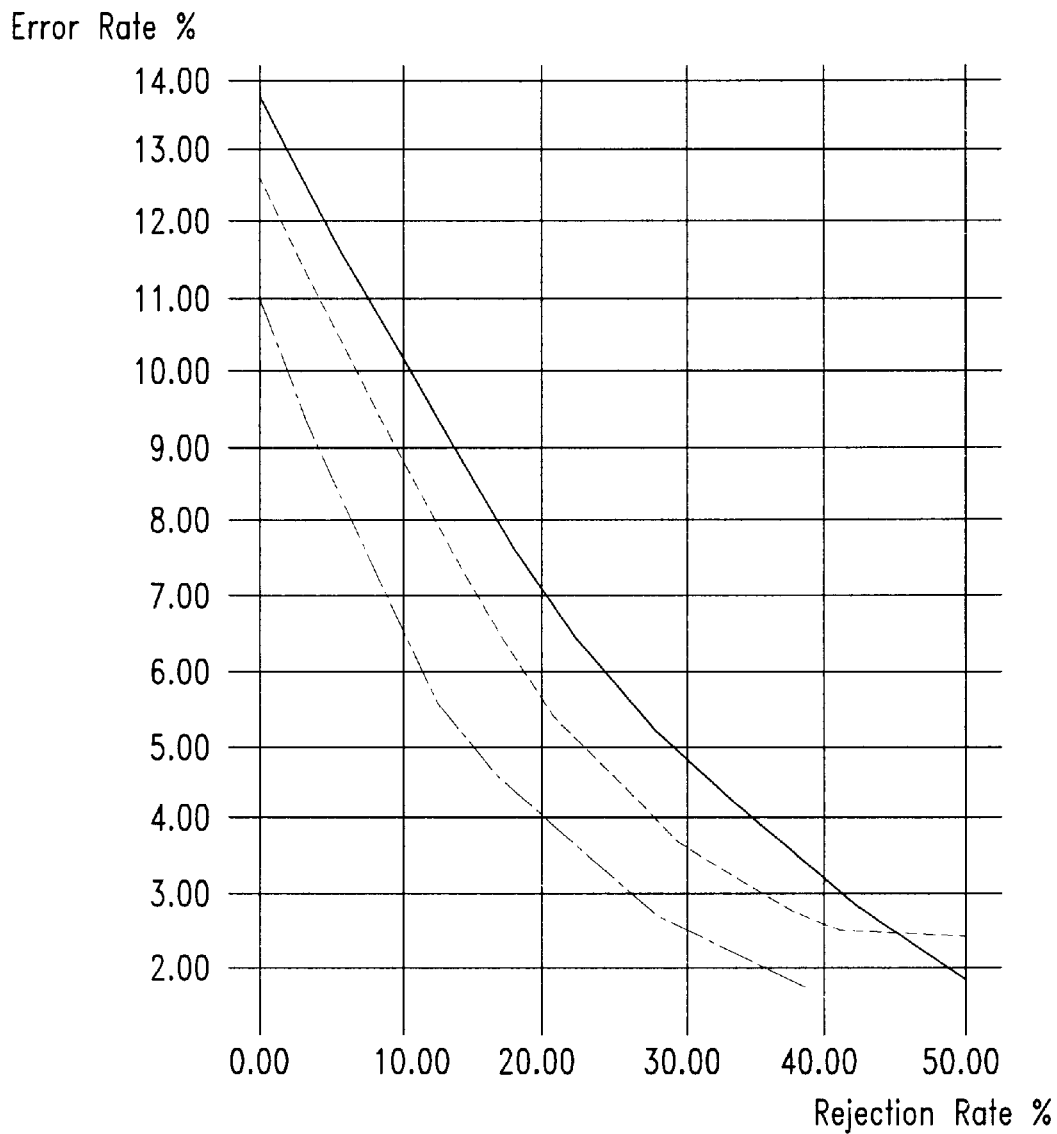
FIG. 7 shows a chart in which the image recognition quality of lower-case letters for a recognition system provided in accordance with the present invention is compared with that of known systems for the same lower-case letters.

For comparison of the recognition qualities of systems, there are used charts given in FIGS. 5, 6, and 7, for recognition of numerical character images, upper case letter images, and lower-case letter images respectively, which show on the ordinate the percentage of error for the percentage of images not recognized, i.e., rejected, by the systems analyzed.

The error is reported as a percentage by dividing the number of images incorrectly classified by the considered systems by the sum of the number of images classified correctly and incorrectly by the considered systems.

If a system operates correctly, the corresponding curve on the charts decreases, since the ambiguous images are those which contribute most to the classification errors.

Therefore, the "lower" the curve associated with a given system on each of the charts of FIGS. 5, 6 and 7, the better the quality of recognition of the system.

To obtain these charts, there is used an assemblage of images related to the so-called NIST Test Data 1, which contains 58646 numerical character images, 11941 capital letter images and 12000 lower-case letter images.

In the three charts of FIGS. 5, 6 and 7 are shown the curves of known systems while the curve for the inventive system described here is the one denominated "DEIS".

The DEIS curve is the "lowest" on each of the charts, showing that the quality of recognition of the system which is the object of this patent application is the best of those of the systems analyzed.

Concerning the above illustration and description of an embodiment of the invention, variations and modifications thereof are possible without departing from the spirit and scope of the inventive concept.

What is claimed is:

1. A system for recognizing an alphanumeric character image, said system comprising:

a first stage including at least a first, second and third digital image signal processing networks having each at least one input terminal and at least one output terminal and said networks being designed to process image information from digital image signals and including at least a first, second and third memory registers having each at least one input terminal and at least one output terminal and the input terminals of the first, second and third memory registers being connected to the output terminal of the first network, the output terminal of the second network and the output terminal of the third network respectively and said memory registers being designed to contain the image information processed by the first, second and third digital image signal processing networks;

a second stage;

wherein the first network provides information related to a first feature vector of the image, the second network provides information related to a second feature vector of the image, the third network provides information related to a third feature vector of the image;

wherein said second stage includes at least one first and one second classifier network having each at least one first and one second input terminal and a plurality of output terminals, the first input terminal of the first classifier network being connected to the output terminal of the first memory register and the second input terminal of said first classifier network being connected to the output terminal of the second memory register and the first input terminal of the second classifier network being connected to the output terminal of the second memory register and the second input terminal of said second classifier network being connected to the output terminal of the third memory register;

at least one third classifier network having a plurality of input terminals connected to a plurality of output terminals of the first and second classifier networks and a plurality of output terminals which are output terminals of the system; and wherein said classifier networks carry out consecutive statistical operations on said data from said first, second, and third processing networks until there are obtained statistical values corresponding to a predetermined classification of said image.

2. System in accordance with claim 1 characterized in that between an input of the system and the input terminal of at least one of said first, second and third signal processing networks is inserted at least one first filter having at least one input terminal and at least one output terminal and at least one first memory element having at least one input terminal connected to the output terminal of the first filter and at least one output terminal and said filter being designed to perform a normalization of digital signals of an image input and said memory element being designed to memorize digital signals of normalized images.

3. System in accordance with claim 1 characterized in that the first and second classifier networks are neural networks each including at least a first layer of neurons and each neuron of the first classifier network having at least one first and one second input terminal connected to the output terminal of the first memory register and to the output terminal of the second memory register respectively and at least one output terminal, and each of the neurons of the second classifier network having at least one first and one second input terminal connected to the output terminal of the second memory register and to the output terminal of the third memory register respectively and at least one output terminal.

4. System in accordance with claim 3 characterized in that the first classifier network and the second classifier network each include at least one second layer of neurons each having a plurality of input terminals connected to a plurality of output terminals of the first neuron layer.

5. System in accordance with claim 3 characterized in that the third classifier network is a neural network including at least one layer of neurons each having a plurality of input terminals connected to a plurality of output terminals of neurons of the first classifier network and neurons of the second classifier network and at least one output terminal which is an output terminal of the system.

6. System in accordance with claim 1 characterized in that the neurons of the first, second and third statistical networks are the sigmoidal type.

7. System in accordance with claim 1 characterized in that the second stage includes at least a fourth classifier network having at least a first and a second input terminal and the first input terminal of the fourth classifier network being connected to the output terminal of the first memory register and the second input terminal of said fourth classifier network being connected to the output terminal of the third memory register and a plurality of output terminals connected to a plurality of input terminals of the third classifier network.

8. System in accordance with claim 7 characterized in that the fourth classifier network is a neural network including at least one first layer of neurons and each of said neurons having at least one first and one second input terminal connected to the output terminal of the first memory register and to the output terminal of the third memory register respectively and at least one output terminal.

9. System in accordance with claim 8 characterized in that the fourth classifier network includes at least one second layer of neurons each having a plurality of input terminals connected to a plurality of output terminals of neurons of the first level.

10. System in accordance with claim 8 characterized in that the neurons of the fourth classifier network are the sigmoidal type.

11. System in accordance with claim 1 characterized in that the image information memorized in the first memory register is information on the position of the dark points of the image.

12. System in accordance with claim 1 characterized in that the image information memorized in the second memory register is information on the directions of the tangents to the points of said edge.

13. System in accordance with claim 1 characterized in that the image information memorized in the third memory register is information on the curvature of the edge of the image, said information expressed as contours at points of said edge.

14. Apparatus for recognizing an alphanumeric character from an image of said character, said apparatus comprising:
a first classifier network having a first input terminal coupled to receive a first feature vector of said character, a second input terminal coupled to receive a second feature vector of said character, and a plurality of output terminals;
a second classifier network having a first input terminal coupled to receive said second feature vector, a second input terminal coupled to receive a third feature vector of said character, and a plurality of output terminals;
a third classifier network having a plurality of input terminals coupled to said pluralities of output terminals of said first and second classifier networks, and a plurality of output terminals operable to carry a statistical value corresponding to a predetermined classification of said image; and
wherein said third classifier network is operable to carry out consecutive statistical operations on information received from said first and second classifier networks until said statistical value is generated.

15. The apparatus of claim 14 further comprising:
a first digital image signal processing network operable to generate said first feature vector from a first digital image signal;
a second digital image signal processing network operable to generate said second feature vector from a second digital image signal; and
a third digital image signal processing network operable to generate said third feature vector from a third digital image signal.

16. The apparatus of claim 15 further comprising:
a first memory in communication with said first processing and classifier networks and operable to store information carried by said first feature vector;
a second memory in communication with said second processing network and said first and second classifier networks, and operable to store information carried by said second feature vector; and
a third memory in communication with said third processing and said second classifier networks, and operable to store information carried by said third feature vector.

17. The apparatus of claim 15 further comprising:
a filter operable to normalize raw data representative of said image and to generate therefrom one or more of said first, second, and third digital image signals;
a memory in communication with one or more of said first, second, and third processing networks and operable to store information from those of said first, second, and third digital image signals generated by said filter.

18. The apparatus of claim 14 wherein said first and second classifier networks each comprise a neural network that includes a first layer of neurons,
each neuron of said first classifier network having first and second neural inputs respectively coupled to said first and second inputs of said first classifier network, and having at least one output terminal, and
each neuron of said second classifier network having first and second neural inputs respectively coupled to said first and second inputs of said second classifier network, and having at least one output terminal.

19. The apparatus of claim 18 wherein said first and second classifier networks each include a second layer of neurons each having a plurality of input terminals coupled to a plurality of said output terminals of said neurons of a respective one of said first layers.

20. The apparatus of claim 18 wherein said third classifier network comprises a layer of neurons each having a plurality of input terminals coupled to a plurality of said output terminals of said neurons of said first and second classifier networks, each of said third-network neurons having an output terminal coupled to one of said plurality of output terminals of said third classifier network.

21. The apparatus of claim 20 wherein said neurons of said first, second, and third classifier networks are sigmoidal neurons.

22. The apparatus of claim 14 further comprising a fourth classifier network having a first input terminal coupled to receive said first feature vector, a second input terminal coupled to receive said third feature vector, and a plurality of output terminals coupled to said input terminals of said third classifier network.

23. The apparatus of claim 14 wherein said first feature vector carries information including the positions of black pixels within said image.

24. The apparatus of claim 14 wherein said second feature vector carries information including the direction of the tangents at the points composing an edge of said image.

25. The apparatus of claim 14 wherein said third feature vector carries information including the contours formed by the points composing an edge of said image.

26. A method for identifying an alphanumeric character, comprising:

scanning said character to generate image data;

generating first feature data, second feature data, and third feature data from said image data;

processing said first and second feature data with a first neural network to generate a first signal;

processing said second and third feature data with a second neural network to generate a second signal; and processing said first and second signals with a third neural network to identify said character.

27. The method of claim 26 wherein said image data includes light points having positions, and wherein said generating first feature data comprises providing said positions of said light points as said first feature data.

28. The method of claim 26 wherein said generating said second feature data comprises:

identifying one or more of the points that define an edge of said character;

calculating the first derivative of the curve formed by said edge at said identified points; and providing said first derivative as said second feature data.

29. The method of claim 26 wherein said generating said third feature data comprises:

identifying one or more of the points that define an edge of said character;

calculating the second derivative of the curve formed by said edge at said identified points; and providing said second derivative as said third feature data.

30. A method for identifying an alphanumeric character, comprising:

generating image data for said character;

generating first feature data, second feature data, and third feature data from said image data;

processing said first and second feature data with a first neural network to generate a first signal;

processing said second and third feature data with a second neural network to generate a second signal;

processing said first and third feature data with a third neural network to generate a third signal; and processing said first, second, and third signals with a fourth neural network to identify said character.

31. The method of claim 30 wherein said first, second, and third neural networks each comprise multiple layers of intercoupled neurons.

* * * * *